United States Patent [19]

Gangemi et al.

[11] Patent Number: 4,540,890
[45] Date of Patent: Sep. 10, 1985

[54] SYSTEM FOR SELECTIVELY ADDRESSING ELECTRICAL CONTROL SIGNALS FROM A CONTROL UNIT TO A PLURALITY OF REMOTE UNITS

[75] Inventors: Giovanni Gangemi; Giuseppe Sefusatti, both of Turin, Italy

[73] Assignee: Galber Automazione E, Turin, Italy

[21] Appl. No.: 554,666

[22] Filed: Nov. 23, 1983

[30] Foreign Application Priority Data

May 24, 1982 [IT] Italy ................................ 87669 A/82

[51] Int. Cl.³ .......................... H02J 13/00; H04Q 9/10
[52] U.S. Cl. .......................................... 307/40; 307/1; 307/41; 340/310 R; 340/310 A
[58] Field of Search ................... 307/1, 3, 38, 39, 40, 307/41; 340/310 R, 310 A

[56] References Cited

U.S. PATENT DOCUMENTS

| | | | |
|---|---|---|---|
| 3,729,710 | 4/1973 | Sherwin ........................... | 340/310 A |
| 4,131,882 | 12/1978 | Hollasaugh et al. ........... | 340/310 A |
| 4,348,582 | 9/1982 | Budek ............................... | 307/40 X |
| 4,361,766 | 11/1982 | de Montgolfier et al. ..... | 307/3 |
| 4,385,241 | 5/1983 | Peddie et al. .................... | 307/39 |
| 4,471,232 | 9/1984 | Peddie et al. .................... | 307/40 X |

Primary Examiner—A. D. Pellinen
Assistant Examiner—Derek S. Jennings
Attorney, Agent, or Firm—Sughrue, Mion, Zinn, Macpeak and Seas

[57] ABSTRACT

The system comprises a central control unit and a plurality of remote units connected to the control unit by a single, common, transmission link. This link acts simultaneously as a signalling link and as the electrical voltage supply line for the remote units. The control unit transmits electrical control signals to the remote unit by superimposing trains of pulses on the supply voltage that is fed via the transmission link to the remote units. Each remote unit is arranged to count the control signal pulses appearing on the line and to activate one or more controlled devices when the number of pulses counted corresponds to a unique number associated therewith. A first type of controlled device is constituted by sensor means arranged to monitor a physical quantity and to output, when activated, related electrical information signals indicating to the control unit the value of the monitored quantity; the information signals take the form of frequency modulation of the current flowing in the transmission link. A second type of controlled device is constituted by actuators which when activated are arranged to effect predetermined operations.

2 Claims, 7 Drawing Figures

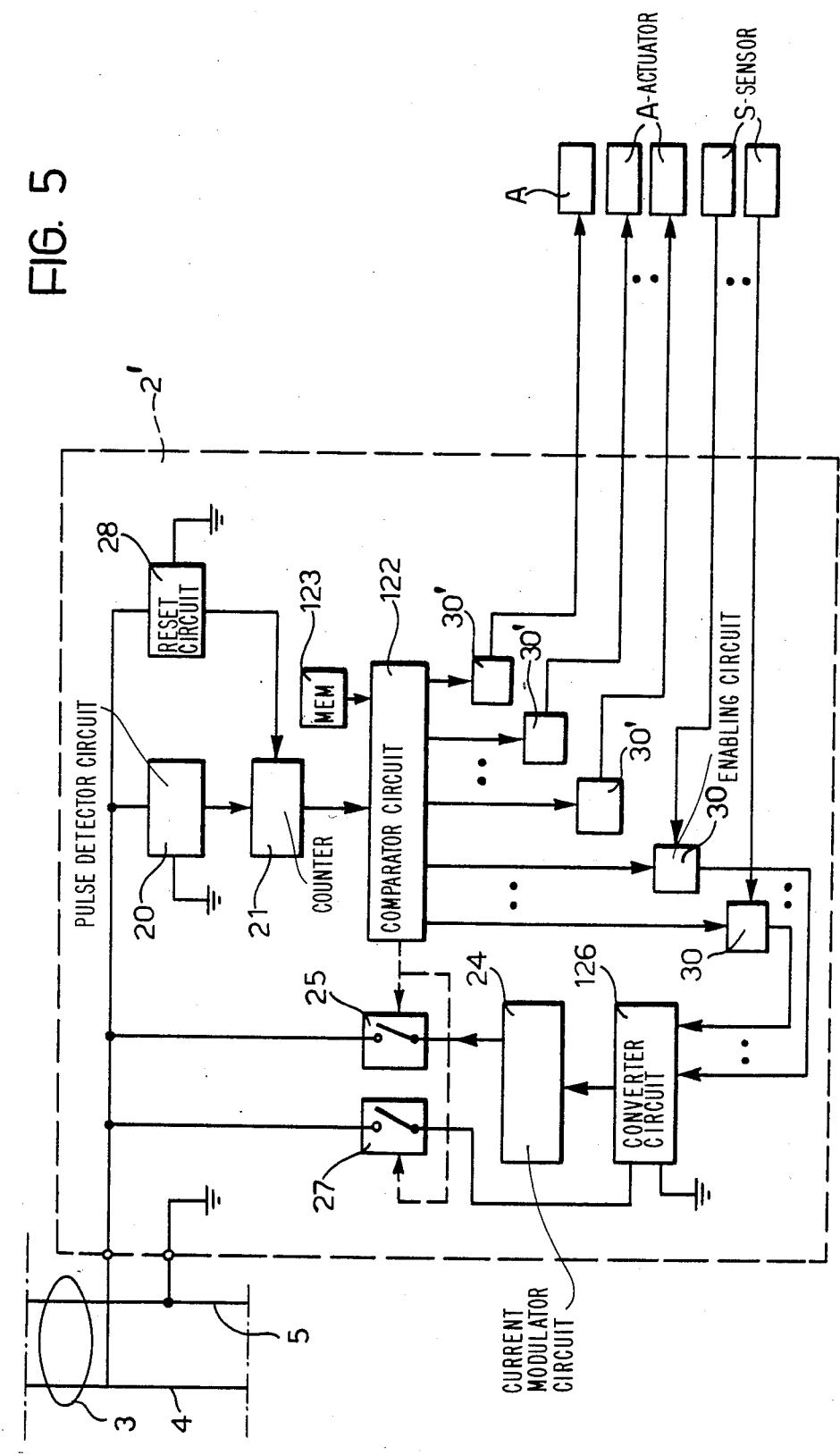

SYSTEM FOR SELECTIVELY ADDRESSING ELECTRICAL CONTROL SIGNALS FROM A CONTROL UNIT TO A PLURALITY OF REMOTE UNITS

BACKGROUND OF THE INVENTION

The present invention relates to a system of the type in which a control unit is arranged to selectively address electrical control signals, via a single common transmission link, to a plurality of remote units whereby to selectively activate controlled devices associated with these units. These controlled devices may be actuator means for carrying out respective predetermined operations and/or sensor means for transmitting to the control unit, via the said link, electrical information signals indicative of the value of a respective monitored physical quantity.

The object of the present invention is to provide a system for addressing electrical signals from a control unit to a plurality of remote units of the type outlined above which is simple and economical to manufacture, easy to instal and which has a high degree of reliability and flexibility in use.

SUMMARY OF THE INVENTION

In order to achieve this object, the present invention provides a system of the aforesaid type, wherein the said control unit is arranged to output the control signals in the form of pulse trains each comprising a number of pulses which is variable between 1 and N where N is a positive integer, the control unit being further arranged to intermittently output on said link synchronisation signals distinguishable from said control signals, and the said remote units each comprising:
- synchronisation means for identifying the presence of a said synchronisation signal on said link,
- memory means storing at least one predetermined integer identification number, between 1 and N, which number is different for each remote unit,
- pulse counter means connected to said link for counting, in operation, the number of said pulses received via the link subsequent to the identification of a said synchronisation signal on the line by said synchronisation means; and
- comparator means connected to said memory means and to said pulse counter means and arranged to output an activation signal to the said controlled device of the unit when the number of pulses counted by the pulse counter means equals a said identification number stored in the memory means.

Preferably, the said link is a two-wire line and the said remote units are connected to the line in parallel, the control unit including:
- DC voltage supply means connected to the said line to feed a supply voltage to the remote units, and
- pulse train generator means connected to the said supply means so that the voltage applied by the control unit to the said line is equal to the superposition of the pulse trains on the supply voltage;

each remote unit including pulse sensor means connected between the line and the said pulse counter means and arranged to detect the presence of voltage pulses on said line.

This latter arrangement is particularly advantageous in that it allows, with a simple two-wire line, the addressing of signals by the control unit to the remote units, the supply of voltage to the remote units, and the transmission of any information signals from the remote units to the central control unit.

BRIEF DESCRIPTION OF THE DRAWINGS

Further characteristics and advantages of the system according to the invention will become apparent from the detailed description which follows, given with reference to the appended drawings, provided purely by way of non-limiting example, in which:

FIG. 5 is an electrical diagram, partially in block form, of a first variant of the remote unit illustrated in FIG. 3.

DESCRIPTION OF THE PREFERRED EMBODIMENTS

Figure 1:
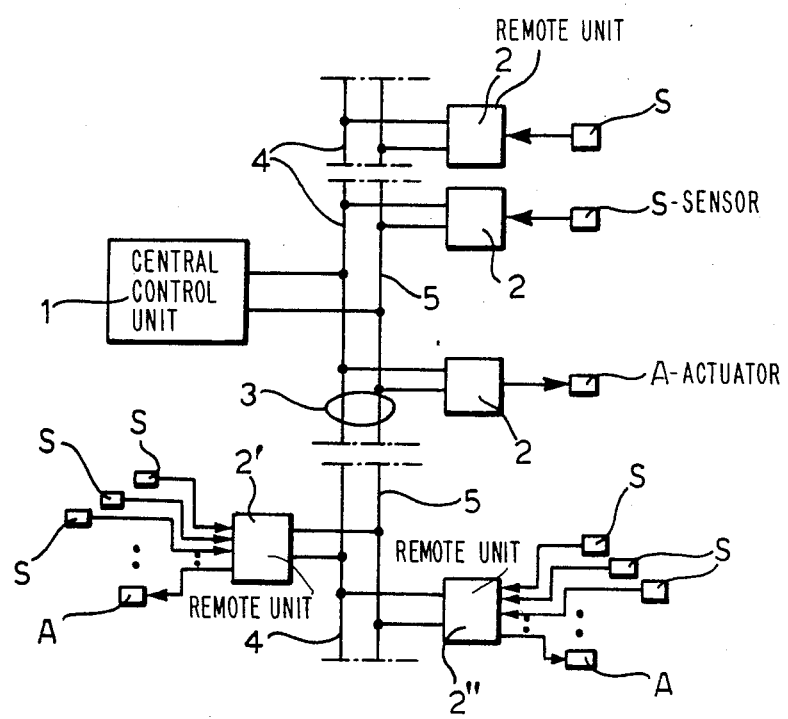
FIG. 1 is a block schematic diagram of a system embodying the invention.

With reference to FIG. 1, a system embodying the invention comprises a central control unit 1 and a plurality of remote units 2, 2', 2''. The remote units 2, 2', 2'' are connected to the central unit 1 via a single transmission link 3 which in the present example is a two-wire line comprising two conductors 4, 5.

Each of the remote units 2 or 2' or 2'' has one or more associated controlled devices which may be constituted by sensor means and/or by actuators. Where a controlled device is constituted by sensor means, the means are arranged, when activated from the control unit via the corresponding remote unit, to output to the control unit 1, via the line 3, electrical information signals indicative of the value of a respective physical quantity monitored by a sensing element of the sensing means. Where a controlled device is an actuator device, this latter when activated in response to a control signal transmitted thereto by the control unit 1 via the line 3 and the corresponding remote unit 2, is arranged to effect a predetermined operation.

In the example illustrated in FIG. 1, sensor elements have been indicated S and actuator devices have been indicated A.

The system shown schematically in FIG. 1 may, for example, be used to detect and locate losses in pressurised telecommunication cables. Such a system may also be used for detecting and locating breaks in gas, oil and water pipelines etc. In these applications, the sensing elements may be constituted, for example, by pressure transducers, temperature sensors, flow sensors etc.

The system can also be used, for example, in agriculture for monitoring parameters such as temperature and humidity, and for the remote control of actuator devices.

Further applications are possible in the industrial field for the controlling and monitoring of plant.

The form and operation of a control unit 1, and of a first embodiment of a remote unit 2, of the system according to the invention will now be described with reference to FIG. 2 and 3.

Figure 2:
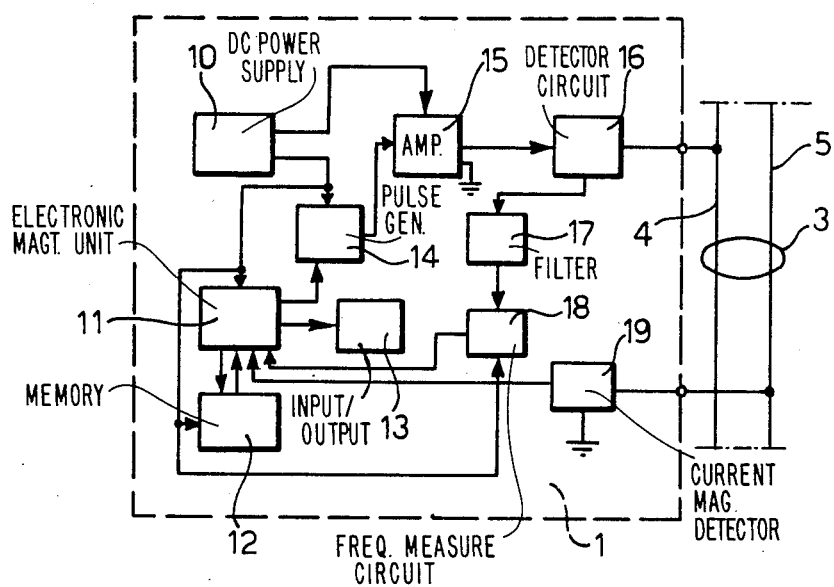
FIG. 2 is an electrical diagram, partially in block form, of a central control unit of the FIG. 1 system.

The control unit illustrated in FIG. 2 includes a DC power supply device 10 intended for connection (in a manner not shown) to an electrical supply network. The control unit 1 includes an electronic management unit 11 for the system, formed for example using microprocessors, provided with memory circuits 12 for data and instructions. The electronic management unit 11 may be connected to input/output devices 13 such as, for example, a printer or video terminal.

The management unit 11 and the memory circuits 12 receive the necessary DC supply voltages from the supply device 10.

As will be clarified below, the electronic management unit 11 controls a pulse train generator circuit 14. This circuit, of known type, is arranged to generate pulse trains comprising a variable number of pulses with a predetermined period ($T_1 = 1/f_1$). The pulses output by the circuit 14 in operation are fed to an amplifier 15 fed with a DC supply voltage from the supply device 10. The amplifier 15 outputs a voltage which, at each moment, is equal to the superposition of a constant DC supply voltage $V_a$ and pulse trains corresponding to the pulse trains produced by the circuit 14 (amplified). This voltage, is applied through a frequency modulation detector circuit 16 (for example a transformer the functions of which will be described below) across the conductors 4,5 of the two-wire line 3.

The amplitude of the pulses superimposed on the DC supply voltage is preferably less than the value of the supply voltage and may, for example, switch between voltages within the range $V_a \pm 10\%$, $V_a$ being the value of the constant DC supply voltage.

Figure 4:
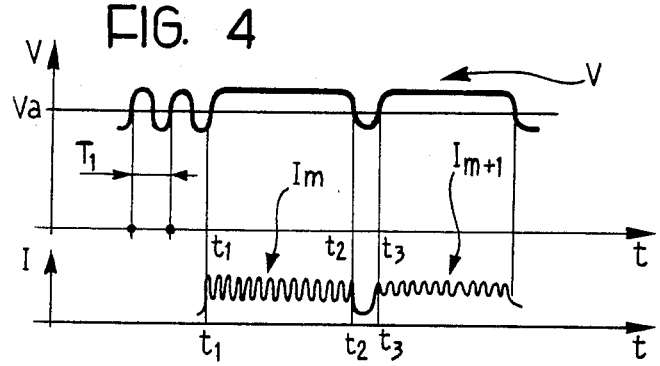
FIG. 4 shows two graphs illustrating signal waveforms generated in the FIG. 1 system during operation.

In other words, the voltage V applied to the line 3 may vary (as a function of time t) in the manner indicated by the line illustrated in the upper graph in FIG. 4.

The voltage V is applied through the two-wire line 3 to the input terminals of each of the remote units. This line thus also acts as the electrical supply line.

The frequency modulation detector circuit 16 has its output connected to the input of a bandpass filter 17 the output of which is connected in its turn to the input of a frequency measuring circuit 18. This circuit, in operation, provides the electronic management unit 11 with electrical signals indicative of the frequency of the signal at its input.

The control unit 1 may further include a circuit 19 for detecting the magnitude of the current drawn in operation by the remote units 2, 2', 2''.

Alternatively, the control unit 1 may be arranged to form signals indicative of the information signals by means of a measurement of period instead of frequency.

Figure 3:
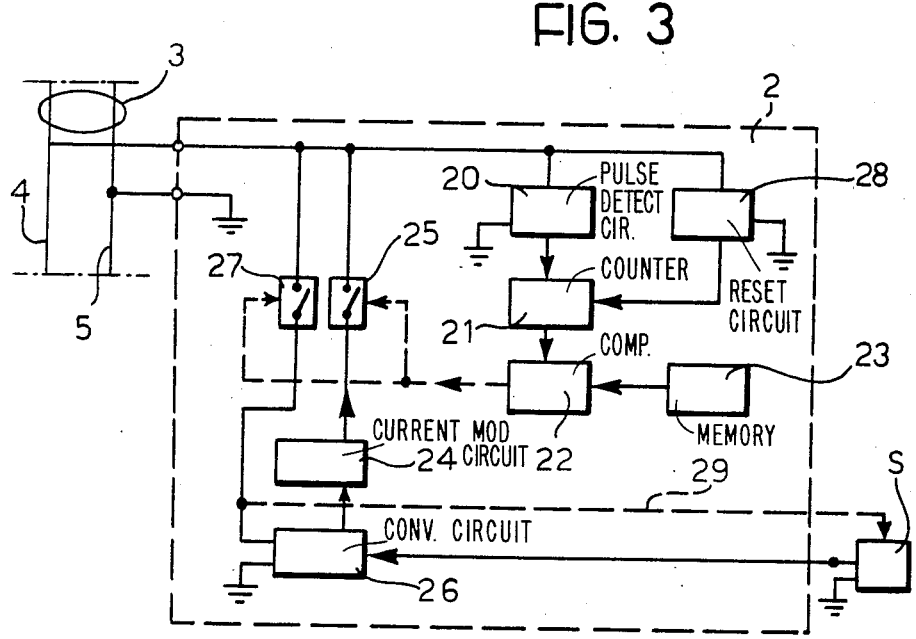
FIG. 3 is an electrical diagram, partly in block form, showing the structure of a first form of a remote unit of the FIG. 1 system.

In FIG. 3, a first type of remote unit 2 is illustrated, this type being intended for use with a single sensing element S or a single actuator device. In this embodiment, a pulse detector circuit indicated 20 is connected to the two-wire line 3. The pulse detector circuit 20, of conventional type, is arranged to output a pulse every time the voltage V between the conductors 4, 5 of the line 3 presents (for example) a rising edge. The output of this circuit is connected to the input of a binary counter 21 which, in operation, counts the pulses fed to it by the circuit 20.

The output of the counter 21 is connected to a first input of a comparator circuit 22 having a second input connected to a memory device 23. In this memory device, in use, are stored data or bits indicative of an integer identification number of the remote unit 2. The identification number attributed to each remote unit is between 1 and a maximum value N greater than or equal to the number of remote units connected to the control unit. This identification number is different for each remote unit. The comparator circuit 22 acts basically as a coincidence detector, outputting an activation signal whenever the number of pulses counted by the counter 21 equals the identification number stored in the memory device 23. This latter is preferably of the type which is externally reprogrammable. Such memory devices are well known and readily available on the market.

The remote unit of the type illustrated in FIG. 2 further includes a current modulator circuit 24 the output of which may be connected to the line 3 by means of an enabling circuit 25, for example a switch controlled by the comparator circuit 22. The input of the current modulator circuit 24 is connected to the output of a converter circuit 26 of the type arranged to convert an analogue signal (voltage, current) into a frequency modulated signal. The input of this converter circuit 26 is connected to a sensing element S intended to output an analogue signal indicative of the value of a physical quantity (for example a temperature, a pressure, etc) monitored thereby.

The converter circuit 26 receives a DC supply voltage from the two-wire line 3 through an enabling circuit 27, for example a switch, also controlled by the comparator circuit 22.

The sensing element S and the circuits 24, 25, 26 together constitute sensor means arranged to be activated by an activation signal output from the comparator circuit 22.

Supposing that the system illustrated in FIG. 1 only includes remote units of the type illustrated in FIG. 3. Such a system operates as follows.

On installation of the system, each remote unit 2 is allotted a respective integer identification number in the manner described above, this being memorised in the corresponding memory device 23.

The electronic management unit 11 of the control unit 1 is programmed by conventional techniques, such as to cause the circuit 14 to generate pulse trains having a number of pulses which is variable in a predetermined manner. These pulses are amplified and superimposed on the DC supply voltage by means of the amplifier circuit 15 in the manner described above. In operation, the voltage V thus obtained is fed simultaneously to the inputs of all the remote units. In each remote unit the said pulses are counted by the counter circuit 21. Supposing for example that during an operating cycle, the control unit 1 feeds a number m of pulses into the two-wire line 3. In this case only the comparator circuit 22 of the remote unit with which the identification number m is associated will detect coincidence between the content of the counter 21 and the memory device 23. The comparator circuit 22 of the remote unit m then causes, through the enabling circuits 25 and 27, the supply of voltage to the converter circuit 26 and the connection of the modulator circuit 24 to the line 3. This event occurs, for example, at the instant $t_1$ in FIG. 4. As a result, the current modulator circuit 24 of the remote unit m modulates the frequency of the current I flowing in the line 3 in a manner proportional to the value of the physical quantity monitored by the sensing element S connected to this remote unit. The current flowing in the line 3 in this situation thus varies in the manner indicated qualitatively by the waveform $I_m$ in FIG. 4. Starting from the instant $t_1$, the frequency modulation detector circuit 16 of the control unit detects the frequency modulation of the current $I_m$. This detector circuit 16 outputs a signal indicative of the degree of this modulation to the frequency measuring circuit 18, via the bandpass filter 17. The circuit 18 transmits to the management unit 11 of the control unit, signals indicative of the frequency deviation of the current $I_m$ relative to a predetermined frequency $f_2$.

This frequency deviation is indicative of the value assumed by the quantity monitored by the sensing element S connected to the remote unit m.

Conveniently, the frequency $f_2$ is much larger (for example by a factor of ten) than the frequency $f_1$ of the pulses emitted by the control unit 1.

The acquisition time for the information signals coming from the remote unit m is determined by the electronic management unit 11 of the control unit 1 according to the manner in which this latter has been programmed. In general, by conventional programming techniques, it is possible to make the acquisition time of each individual remote unit constant or variable at will in a predetermined manner.

After the acquisition time for information signals by the remote unit m has elapsed (indicated by the time $t_2-t_1$ in FIG. 4) the management unit 11 of the control unit 1 may, for example, cause the interrogation of the remote unit to which the identification number $m+1$ has been attributed. For this purpose, the electronic management unit 11 causes the emission of a further pulse by the pulse generator circuit 14. As a consequence, at the instant $t_3$ (FIG. 4) the comparator circuit 22 of the remote unit $m+1$ will allow the current flowing in the line 3 to be frequency modulated by the modulator circuit 24 of the remote unit $m+1$, in dependence on the value assumed by the physical quantity monitored by the sensing element S connected to this remote unit.

The current flowing in the line 3 will thus vary in the manner indicated by $I_{m+1}$ in FIG. 4.

Again in this case, in a manner similar to that described above, the electronic management unit 11 is supplied, after frequency demodulation of the current $I_{m+1}$, with signals indicative of the value assumed by the quantity monitored by the remote unit $m+1$.

By the emission of further pulses, the control unit 1 may then interrogate the remote unit 2 next following the $(m+1)$th in the series, or may jump several according to a predetermined programme.

On the basis of what has been explained above, it is immediately apparent that the control unit may pause for an indefinite period of time to acquire the information signals coming from the remote unit, the identification number of which is equal to the number of pulses already sent. Furthermore, the control unit 1 may send a succession of equi-spaced pulses until the identification number of the remote unit 2 from which it is next desired to acquire information signals has been reached.

When the number of pulses emitted by the control unit 1 reaches the highest identification number attributed to the remote units, then in order to start a subsequent acquisition cycle, the electronic management unit 11 of the control unit 1 causes the temporary cut-off of the voltage supply to the line 3. This cut-off is detected by a reset circuit 28 provided in each remote unit 2, the input of this circuit 28 being connected to the line 3 and its output connected to a reset input of the counter 21 of the corresponding remote unit.

Remote units of the type illustrated in FIG. 2 may be used, instead of for acquiring information signals from sensors and the transmission of these signals to the control unit, for transmitting control or activation signals to actuator devices. For this purpose, it suffices to modify each remote unit by omitting the modulator circuit 24 and the converter circuit 26 and arranging for the actuator device concerned to be supplied with the voltage V on the conductors of the line 3. To this end, the comparator circuit 22 of each remote unit may be arranged to control an individual enabling circuit, for example a switch circuit, which controls the connection of the actuator device to the line 3.

The two possible modes of use of the remote units of the type illustrated in FIG. 3, that is the mode of "acquisition of information signals only" and the mode of "transmission of control signals to actuator devices only", can be combined together in a manner which would be elementary for an expert in the art, to achieve, for example, the remote control of an actuator device, with acquisition by the control unit 1 of information signals indicative of the operation of the actuator device controlled.

In the case of sensors (or actuators) which require a DC supply voltage for their operation, this latter may be provided, (for example by means of the enabling circuit 27 of each remote unit) simultaneously with the supply of the converter circuit 26 as illustrated by the connection 29 in broken outline in FIG. 3.

FIG. 5 shows a variant of the remote unit 2' useable in the system according to the invention. This variant has been conceived and developed to allow the acquisition of information signals from a plurality of sensor devices and the control of a plurality of actuator devices by means of a single remote unit of the system.

In FIG. 5, the devices of the remote unit 2' already described with reference to the remote unit 2 illustrated in FIG. 3 have been given the same reference numerals.

In the variant illustrated in FIG. 5, each remote unit 2' comprises a memory device 123 arranged to memorise a group of n integer identification numbers different from the identification numbers attributed to the other remote units 2 or 2' of the system, each number being associated with a respective sensor element S or actuator A connected to the remote unit. In each remote unit 2' the comparator circuit 122 has n outputs each of which is connected to a first input of a respective enabling circuit 30 or 30'. The enabling circuits 30 each have a further input connected to the output of a respective sensing element S and an output connected to a respective input of a converter circuit 126 similar to the converter circuit 26 of FIG. 3. The output of this converter circuit is connected to the input of the current modulator circuit 24.

Each sensing element S, its associated enabling circuit 30, and the circuits 24, 25, 126 together constitute a respective sensor means which can be selectively interrogated by the control unit (the circuits 24, 25 and 126 are, of course, common to each of these sensor means).

The enabling circuits 30' each connected to a respective actuator A.

Naturally a unit 2' may be connected solely to sensing elements or solely to actuator devices or to both sensing elements and actuator devices as illustrated in FIG. 5.

The comparator circuit 122 is arranged to output an activation signal to the i-th sensing element or actuator of the n sensing elements or actuators connected to the remote unit 2', when the number of pulses counted by the counter 21 is equal to the identification number associated with the i-th sensing element or actuator.

Remote units of the type illustrated in FIG. 5 allow the potential of the entire system to be expanded. Moreover, their operation is similar to that of remote units of the type illustrated in FIG. 3 and hence will not be described further below.

By the expression "arranged to memorise a group of n identification numbers" used previously with reference to the memory device 123, it is not intended necessarily that there are n numbers memorised in the circuit. For the purpose of storing n successive numbers it may be sufficient to store the smallest number $n_1$ and the largest $n_2$ of these numbers ($n_2 - n_1 = n$) or even only the smallest or largest of the n numbers.

Figure 6:
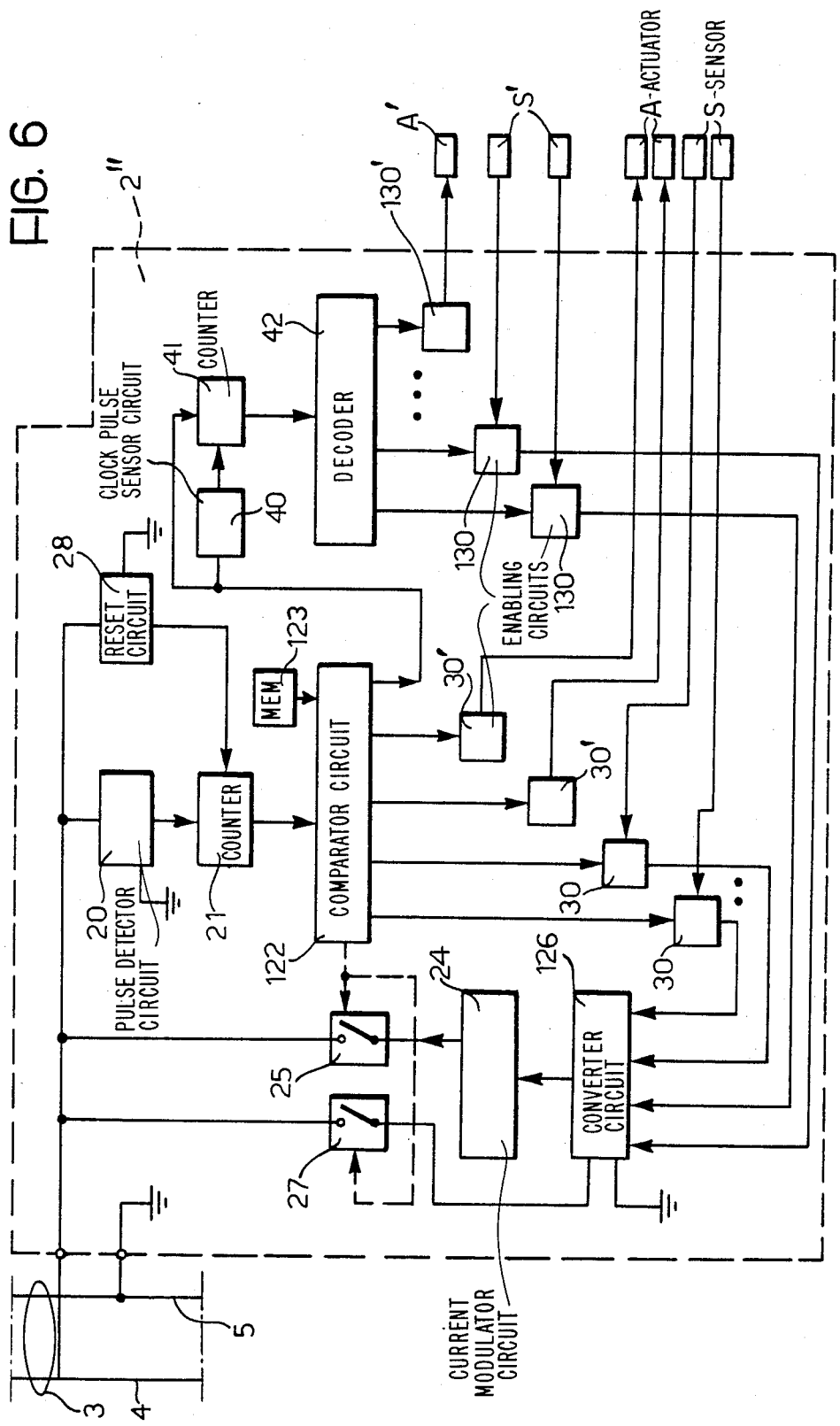
FIG. 6 illustrates a variant of the remote unit of FIG. 5.

FIG. 6 illustrates a further variant of a remote unit 2" useable in the system according to the invention. This variant is similar in many respects to that described with reference to FIG. 5. Consequently, in FIG. 6 the devices already described with reference to FIG. 5 have been attributed the same reference numerals.

In the variant of FIG. 6, a remote unit 2" comprises a memory device 123 arranged to store a group of n integer identification numbers (different from all the other identification numbers attributed to the other remote units) each of which is also in this case associated with a respective sensing element or actuator connected to the remote unit. In the present variant, this group of n identification numbers is divided into two separate groups each including respectively n' and n" identification numbers ($n' + n'' = n$).

Equally, the outputs of the comparator circuit 122 are divided into two sub-groups of n' and n" outputs. In the case illustrated in FIG. 6, the comparator circuit 122 has n=5 outputs divided into two groups of n'=4 and n"=1 outputs respectively. The n' outputs of the comparator circuit 122 are connected to enabling circuits 30, 30' in a manner similar to the outputs of the circuit 122 illustrated in FIG. 5. The final ouput of the circuit 122 is connected to a clock pulse generator circuit 40 and to a first input of a counter circuit 41. This latter has a second input connected to the output of the clock pulse generator circuit 40. The output of the counter 41 is connected to the input of a binary/decimal decoder circuit 42, the ouputs of which are connected to enabling circuits 130, 130'. The enabling circuits 130 are structurally identical to the enabling circuits 30 with each having a second input connected to a respective sensing element S', and an output connected to the converter circuit 126. The enabling circuits 130' are structurally identical to the enabling circuits 30' and are connected to respective actuator devices A'.

When, during operation, the number of pulses counted by the counter circuit 21 in a remote unit 2" coincides with one of the n identification numbers stored in the memory device 123, the comparator circuit 122 outputs an enabling or control signal at its output with which this identification number is associated. If this identification number belongs to the subgroup n', the operation of the remote unit 2" is practically identical to that of a remote unit of the type illustrated in FIG. 5. When, however, the number of pulses counted by the counter 21 is equal to an identification number within the sub group n" (that is, is equal in the example of FIG. 6, to the identification number associated with the final output of the comparator circuit 122), the clock pulse generator circuit 40 is activated. This latter, through the counter circuit 41 and the decoder circuit 42 controls the scanning of the sensing elements S' and/or the actuator devices A' associated with the said decoder circuit 42.

Figure 7:
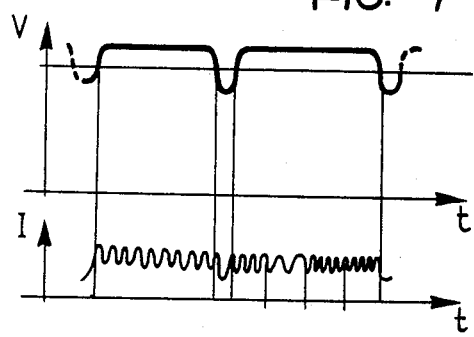
FIG. 7 shows two signal waveforms generated during operation of a system including remote units of the type illustrated in FIG. 6.

FIG. 7 illustrates on the right hand side of the lower graph, the scanning of four sensing elements S'.

A remote unit 2" of the type illustrated in FIG. 6 allows the sensing elements and/or the actuator devices connected to the remote unit to be divided into two separate groups. The control unit 1 can direct electrical control signals to the first group (A, S) to control the acquisition of information signals or the carrying out of a predetermined operation in a selective manner. This manner of addressing may be defined as "synchronous" since in each case the acquisition of electrical information signals or the execution of a predetermined operation is "synchronous" with the control signal imparted by the control unit.

With the second group of sensing elements or actuators (S', A'), the control unit may address electrical control signals only in an "asynchronous" manner since the control signal sent to this group of devices necessarily involves the successive and ordered scanning of all the sensing elements or actuators of this group.

The sensing elements S', actuators A', and circuits 40, 41, 42, 130, 130' can be considered as forming a single controlled device.

The variant illustrated in FIG. 6 also allows the potential of the system according to the invention to be expanded further.

Naturally, the principle of the invention remaining the same, the embodiments and the particulars of realisation may be varied widely with respect to that described and illustrated purely by way of non-limiting example, without thereby departing from the scope of the present invention.

We claim:

1. A system comprising
a plurality of remote units connected to a common two-wire transmission line with each unit having at least one controlled device,
a control unit including d.c. voltage supply means connected to said line to feed a constant d.c. supply voltage to the remote units, and means for selectively addressing through said line electrical coded control signals to the remote units by amplitude-modulating the value of said d.c. supply voltage to activate a selected one of said controlled devices;
each remote unit comprising
decoder means connected to said line for decoding the control signals from the control unit, and
comparator means arranged to output an activation signal when the signals from the decoder means correspond to an address associated to a controlled device of the remote unit;
wherein said controlled device of at least one remote unit is a sensor means arranged to monitor a physical quantity and responsive to said activation signals being fed thereto to output to the control unit, via said line, information signals indicative of the value of said monitored quantity, said sensor means including
a sensing element arranged to monitor said physical quantity and output electrical signals indicative of its value, a signal converter means arranged to convert the electrical signals output by the sensing elements into frequency modulated electrical signals, current modulator means connected to receive said frequency modulated signals from the converter means and connectable to the said line for the purpose of modulating the current flowing in said line in dependence on said frequency modulated signals, switch means connected between the current modulator means and said line, and controlled by the comparator means to connect the the modulator means to said line when the comparator means output the activation signal, the control unit being provided with frequency demodulator means connected to the said line and arranged to detect the frequency modulation of the current flowing in the line.

2. A system according to claim 1 wherein the said controlled device of at least one remote unit is constituted by actuator means arranged to carry out a predetermined operation in response to receipt of said activation signal.

* * * * *

UNITED STATES PATENT AND TRADEMARK OFFICE
CERTIFICATE OF CORRECTION

PATENT NO. : 4,540,890

DATED : September 10, 1985

INVENTOR(S) : Giovanni GANGEMI and Giuseppe SEFUSATTI

It is certified that error appears in the above-identified patent and that said Letters Patent is hereby corrected as shown below:

On the title page, Assignee should read

-- [73]  Assignee: Galber Automazione e Strumentazione Elettronica di Gangemi & C. S.n.c. --.

[30]  Foreign Application Priority Data -- please delete

Signed and Sealed this

Eighteenth Day of March 1986

[SEAL]

Attest:

DONALD J. QUIGG

Attesting Officer

Commissioner of Patents and Trademarks